Aug. 2, 1960  F. H. HIGHLEY  2,947,502
ACCELERATION INDICATOR FOR AIRCRAFT
Filed Sept. 10, 1958
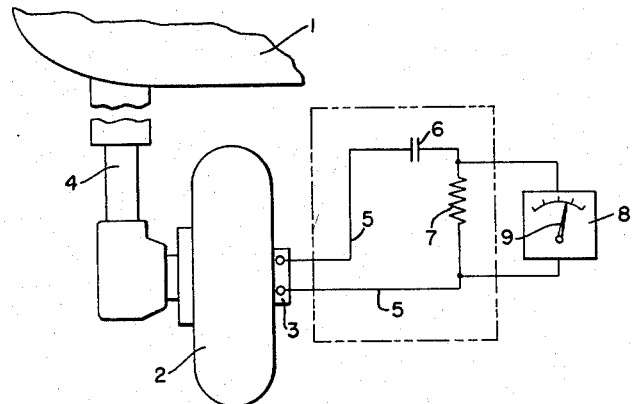
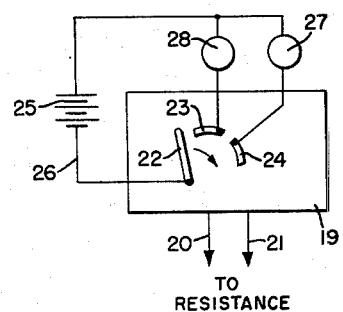
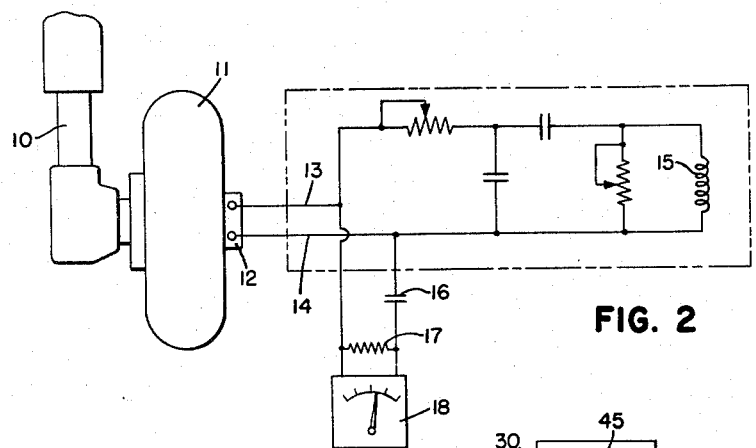
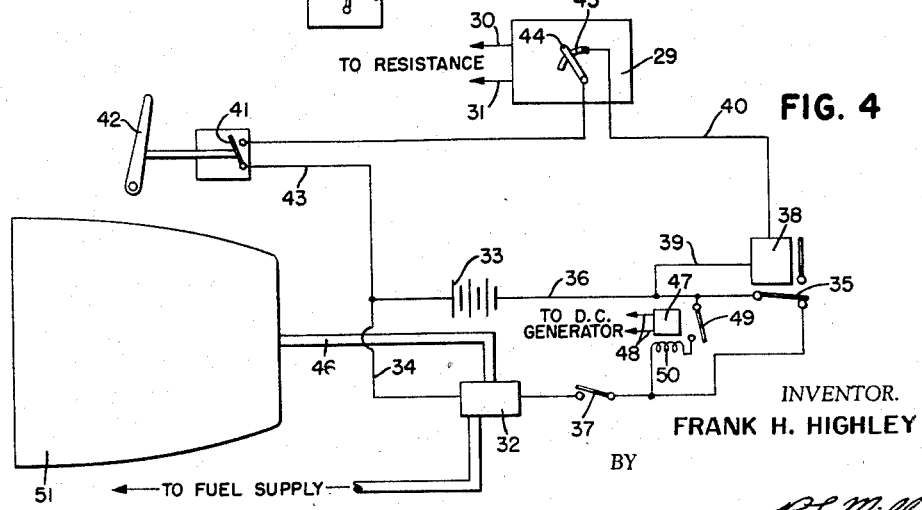
INVENTOR.
FRANK H. HIGHLEY
BY
ATTORNEY United States Patent Office 2,947,502
Patented Aug. 2, 1960

2,947,502
ACCELERATION INDICATOR FOR AIRCRAFT

Frank H. Highley, Canton, Ohio, assignor to The Goodyear Tire & Rubber Company, Akron, Ohio, a corporation of Ohio Filed Sept. 10, 1958, Ser. No. 760,202

5 Claims. (Cl. 244—76)

This invention relates to acceleration indicators, and especially to acceleration indicators for use with aircraft.

When an aircraft is taking off from a given air field, it is very important that the aircraft have the proper acceleration so as to reach take-off speed within the assured clear distance on the landing field and associated clear take-off space. With jet or rocket propelled aircraft there is normally no means to determine whether or not the propulsion system is developing the thrust necessary for a satisfactory acceleration to take-off speed. If the pilot can be advised at an early point in such take-off run whether or not the aircraft has sufficient acceleration to reach the required take-off speed in the runway distance available, it would be very helpful to the pilot so that no emergency stop would be required for the airplane when the pilot would see at the last instant that he was not going to have proper air speed within the available take-off distance. Hence, any safeguard or warning that can be provided to the pilot early in the take-off run to show whether or not the aircraft will reach its proper take-off speed would be very desirable. Many accidents have occurred because pilots had to abort the take-off at the last instant and they were not able to brake the aircraft to a stop within the clear distance remaining on the take-off area.

The general object of the present invention is to provide a novel acceleration indicator for an aircraft characterized by its ability to indicate to the pilot during all stages of the take-off run the acceleration of the aircraft relative to the ground.

Another object of the invention is to utilize a generator provided for anti-skid control (or skid warning) purposes in an aircraft for a second purpose by differentiating the voltage generated therein during take-off to indicate the acceleration of the aircraft by the connection of suitable differentiating and indicator means to the generator.

Another object of the invention is to provide visual means, such as lights or other means, that can be connected to a voltmeter and be energized to show the pilot whether or not he is accelerating at a proper rate to reach his desired take-off speed within the clear limit of the runway available.

Another object of the invention is to provide timing relay means or other similar members in an acceleration circuit on an aircraft so that, after a predetermined time interval, if the acceleration has not reached the value required for take-off under the runway conditions available, the engine would be automatically stopped by closing the throttle, cutting the fuel supply or the like so that a safe braking or stopping action can be provided for the aircraft when still on the runway.

A further object of the invention is to connect a condenser and resistor in series across the output terminals of a generator operatively driven by a support wheel of an aircraft and to read the voltage across such resistance directly in terms of the acceleration of the aircraft to indicate to the pilot the aircraft acceleration.

The foregoing and other objects and advantages will be made more apparent as the specification proceeds.

Reference now should be had to the accompanying drawings, wherein:

Fig. 1 of the drawings shows a conventional type of aircraft wheel and associated support means therefor and with the novel electrical indicator means of the invention being connected to a generator on such support wheel for indicating the acceleration rate of an aircraft to which such support wheel is connected;

Fig. 2 is a view, similar to Fig. 1, only with additional circuit means, such as might be used in anti-skid control or skid warning apparatus, associated with or provided in this control circuit;

Fig. 3 is the modification of the electrical control circuit shown in Fig. 1 wherein a pair of indicator lights are provided to indicate whether or not a desired acceleration has been attained; and Fig. 4 is a view of a further modified type of a control circuit of the invention and wherein time delay means are provided for automatically shutting off the fuel supply for the aircraft engine should the acceleration not reach a predetermined value within a given time interval after starting a take-off run.

When referring to corresponding parts shown in the drawings and referred to in the specification, corresponding numerals are used to facilitate comparison therebetween.

The present invention, in general, relates to acceleration indicating apparatus for aircraft wherein the aircraft has a support strut with a support wheel journalled thereon, and where the apparatus comprises a D.C. generator carried by the support strut and driven by the wheel at a speed proportional thereto to have a voltage output proportional to the speed of the aircraft, resistance and capacitance means are connected across the terminals of the generator, and voltmeter means are electrically connected across said resistance means and are calibrated to indicate the acceleration of the aircraft by measuring the time rate of change of the voltage output of the generator.

The present apparatus is adapted to be used with anti-skid control means such as are disclosed in issued United States Patent No. 2,753,017, or 2,799,462 or skid warning means such as are disclosed in United States patent application Serial Number 693,397. The apparatus of the invention is adapted to be connected in parallel to the operative circuit or relay control means for such anti-skid or skid warning apparatus and to utilize the generator means of the anti-skid control or skid warning apparatus for a dual function in the aircraft.

Attention now is particularly directed to the details of the structure shown in Fig. 1, wherein the numeral 1 indicates an aircraft having a support strut 4 of conventional construction. A support wheel 2 is suitably journalled on 4 and has a D.C. generator 3, associated therewith and driven thereby at a speed proportional to the speed of rotation of the wheel 2 so that the voltage output of the generator indicates the speed of the aircraft to which the strut 4 is secured. Fig. 1 shows that a relatively simple control circuit can be provided and which includes a pair of leads 5 that connect to the terminals of the generator 3 and which have a condenser 6 and a suitable resistance 7 connected in series therein.

It is an important feature of the invention, that a voltmeter 8 be connected across this resistance 7 to measure the voltage across the resistance 7, this being a measure of the rate of change of the generator voltage, and hence an indication of the acceleration. The voltmeter 8 can be of a conventional construction, for example, a vacuum tube voltmeter that is calibrated to measure the voltage across the resistance 7 to read directly in acceleration, such as feet per second/per second, or in miles per hour/per second, etc. by a pointer 9 thereon. Hence, a very effective but positive indication can be provided for the pilot to indicate what the acceleration of the aircraft is and to show the pilot whether or not he will reach satisfactory take-off speed within the limits of the runway. The pilot would naturally calculate in advance the acceleration required for his aircraft to take off safely for a given take-off distance.

In many instances wherein the generator means of the apparatus is to be used in anti-skid or skid warning work also, usually the skid sensing circuit includes filter means and sensitivity controls therein. In order to avoid any improper reading in the acceleration section of the control means, a different type of a control circuit may be provided, as shown in Fig. 2. Thus an aircraft support strut and wheel 10 and 11, respectively, are provided. This wheel 11 has a generator 12 provided thereon and driven thereby, like the generator 3 in Fig. 1, but in this instance the output leads of the generator, shown at 13 and 14, connect to a filter system and sensitivity control means connected to an operating coil 15 for suitable relay and other control means (not shown) by which the actual anti-skid control or skid warning can be effected. These leads 13 and 14 from the generator 12 also connect to a circuit in parallel with the anti-skid control or skid warning circuit and which includes a condenser 16 and a resistance 17 that are connected in series. A voltmeter 18 is connected across the resistance 17 for indicating the voltage across the resistance 17 at all times. Again, such voltmeter 18 is calibrated to read directly in acceleration to give the pilot the information needed.

Yet another type of a control is shown in Fig. 3 wherein a visual warning can be given to the pilot to indicate whether or not a prescribed acceleration rate has been reached. Thus in this instance, for example, a voltmeter 19 is provided and it would have leads 20 and 21 extending therefrom to connect to the resistance, such as the resistance 7 shown in Fig. 1. The voltage across the resistance moves an indicator needle 22 on the voltmeter 19 over the dial thereof. In the embodiment of the invention shown, this voltmeter needle or arm is electrically conductive and is adapted to engage arcuate contacts 23 and 24 carried by the voltmeter at arcuately spaced portions in the sweep or travel of the needle 22 when the normal acceleration is indicated thereby. Any suitable power means, such as battery 25, is connected to the needle 22 by lead 26, and a pair of visual warning lights such as green light 27 and red light 28 are suitably connected to the leads or contacts 24 and 23, respectively. Hence, as the needle 22 is moved over the face of the voltmeter 19, first the red light 28 would go on to show that the acceleration was not up to a desired value, whereas if the pilot saw that the green light 27 was on, and the red light 28 was off, that would show that the desired acceleration was being reached and that satisfactory take-off conditions had been established. Hence the pilot would have a good visual indication early in the take-off run to show whether or not a satisfactory take-off was going to be achieved. The contacts 23 and 24 may be adjustably carried by the voltmeter 19.

Yet another type of control means for use in practice of the invention is shown in the electrical control circuit of Fig. 4. In this instance, a voltmeter 29 is provided and normally would be calibrated in acceleration voltages to read across the resistance 7 (of Fig. 1), as in the other forms of the invention. The voltmeter connects to such resistance by leads 30 and 31. This embodiment of the invention has means therein for controlling the fuel supply for the engine of the aircraft. A power source, such as a battery 33, is connected to solenoid valve 32 (having fuel supply pipe 46 extending to the engine 51) by a lead 34 while a normally closed relay controlled contact 35 is provided in a lead 36 that connects the opposite side of the battery 33 to the solenoid valve 32. The relay controlled contact 35 has a time delay relay 38 provided for control thereof whereby the contact 35 is opened a predetermined time interval after energization of the relay. The relay 38 is energized by means of a lead 39 connecting to the power source and by a second lead 40 connecting to a switch 41 that is closed when a throttle member 42 is advanced to a position, for example, more than two-thirds open, such as it would have during a take-off run. This switch 41 connects to the opposite side of the battery by a lead 43. Voltmeter 29 is likewise connected as shown in lead 40 with voltmeter pointer 44 contacting contact plate 45 to close the electric circuit to relay 38 until such time as the desired and necessary acceleration is reached whereupon the pointer 44 moves off the plate 45, thus de-energizing time delay relay 38.

Thus, in the operation of the circuit described, switch 37 is turned to "on," i.e. is closed to energize and open solenoid valve 32 to allow fuel to flow to the engine 51 via conduit 46. At this time, of course, contact 35 is closed. The pilot opens engine throttle 42 two-thirds or more closing switch 41 to thereby establish an electric circuit through voltmeter 29 to relay 38. Relay 38 then begins to operate with its time delay mechanism taking a selected period, for example, five seconds before it opens contact 35 to break the circuit to solenoid valve 32 and stop the aircraft engine. Accordingly, if the aircraft does not reach within the time delay period the necessary acceleration for take-off of the aircraft the fuel supply is cut off and the aircraft is stopped. On the other hand, if the necessary acceleration for take-off is reached before the time delay period of relay 38 expires this fact causes pointer 44 to move to the right off contact plate 45 on acceleration indicating voltmeter 29 and thereby open the circuit to relay 38 to de-energize it and allow the fuel flow to continue.

In order to shunt out relay 38 and contact 35 and to keep the fuel flowing once the aircraft reaches flying speed and the wheels lift off the ground, a voltage operated relay 47 is provided which is connected by leads 48 directly to the wheel-driven generator 3—12. Thus, once the aircraft comes up to flying speed so that acceleration can be ignored, the voltage output of generator 3—12 is a direct indication of this flying speed and the voltage will be in an amount to then operate relay 47 to close relay contacts 49 and thereby shunt out relay 38 and contact 35. Relay 47 is of the type which will stay latched in until switch 37 is opened, and to this end a latch-in coil 50 of relay 47 is connected in series with switch 37.

While a certain representative embodiment and details have been shown for the purpose of illustrating the invention, it will be apparent to those skilled in this art that various changes and modifications may be made therein without departing from the spirit or scope of the invention.

What is claimed is:

1. Aircraft take-off control mechanism including an electric power source, means, when electrically energized, for providing an essential service to the aircraft engine to keep it operating, electric leads connecting the power source to the means, a time delay relay having a normally closed contact in series with one of the electric leads, a circuit connecting the operating coil of the time delay relay to the power source, a normally open switch in said circuit and adapted to be closed when the engine throttle is opened a selected amount, means for indicating aircraft acceleration and having a normally closed switch in said circuit which opens when an acceleration exceeding that required for take-off has been reached, and latching-in relay means responsive to aircraft speed for shunting out the normally closed contact of the time delay relay.

2. Aircraft take-off control mechanism including an electric power source, engine fuel system means, electric leads connecting the power source to the fuel system means, a time delay relay having a coil and a normally closed pair of contacts, the contacts being in series with one of the electric leads, a circuit connecting the power source to the coil of the time delay relay, an engine throttle, a normally open switch in the circuit which switch is operated by the throttle to close when the throttle is opened, means for measuring acceleration, a normally closed switch in the circuit and operated by the last-named means to open position when an acceleration suitable for take-off is reached, and means for shunting the contacts of the time delay relay when the aircraft is flying.

3. In combination, an aircraft, an engine for the aircraft, an accelerometer, an electrical time delay relay responsive to the accelerometer for shutting off the engine if a given acceleration suitable for take-off is not reached within the time delay time, and means for shunting out the operation of the time delay relay when the aircraft is flying.

4. In combination, an aircraft, an engine for the aircraft, an accelerometer, and an electrical time delay relay responsive to the accelerometer for shutting off the engine if a given acceleration suitable for take-off is not reached within the time delay time.

5. Aircraft take-off control mechanism including an electrical power source, means, when electrically energized for providing an essential service to the aircraft engine to keep it operating, electrical leads connecting said power source to said means, a time delay means having a normally closed contact in series with one of the electrical leads, a circuit for energizing said time delay means from said power source, a normally open switch in said circuit and adapted to be closed when the engine throttle is opened a selected amount, means for indicating aircraft acceleration and having a normally closed switch in said circuit which opens when an acceleration exceeding that required for take-off has been reached, and latching-in relay means responsive to aircraft speed for shunting out the normally closed contact of the time delay means.

References Cited in the file of this patent
UNITED STATES PATENTS

| | | |
|---|---|---|
| 634,937 | Buck | Oct. 17, 1899 |
| 2,311,642 | Crane et al. | Feb. 23, 1943 |
| 2,512,790 | Cleveland | June 27, 1950 |
| 2,614,617 | Bobier | Oct. 21, 1952 |
| 2,620,380 | Baldwin | Dec. 2, 1952 |
| 2,633,188 | Schorn et al. | Mar. 31, 1953 |
| 2,665,860 | Bancroft | Jan. 12, 1954 |